United States Patent [19]

Brunelle et al.

[11] Patent Number: 5,668,186
[45] Date of Patent: Sep. 16, 1997

[54] PROCESS FOR DEPOLYMERIZING POLYESTERS

[75] Inventors: Daniel Joseph Brunelle, Burnt Hills; Ganesh Kailasam, Schenectady; Judith Ann Serth-Guzzo, Slingerlands; Paul Russell Wilson, Albany, all of N.Y.

[73] Assignee: General Electric Company, Schenectady, N.Y.

[21] Appl. No.: 618,742

[22] Filed: Mar. 20, 1996

[51] Int. Cl.$^6$ .......................... C08J 11/04; C08G 63/00; C08L 67/02
[52] U.S. Cl. .......................... 521/48; 528/481; 528/485; 528/491; 528/501; 528/502 A; 528/503; 562/479; 562/481
[58] Field of Search .......................... 528/481, 485, 528/491, 501, 502, 503; 521/48; 562/479, 481

[56] References Cited

U.S. PATENT DOCUMENTS 5,371,112  12/1994  Sayre et al. .......................... 521/48

*Primary Examiner*—Samuel A. Acquah
*Attorney, Agent, or Firm*—William H. Pittman

[57] ABSTRACT

The invention relates to a novel process for depolymerizing polyesters by subjecting the polyesters to catalysts and organic solvents which are substantially free of oxygen and water in order to produce macrocyclic polyester oligomers substantially free of hydroxybutyl terminated linear impurities.

27 Claims, No Drawings

PROCESS FOR DEPOLYMERIZING POLYESTERS

This invention was made with Government support under Contract No. N70NANB2H1237 awarded by the U.S. Government. The Government has certain rights in this invention.

FIELD OF THE INVENTION

This invention relates to a novel process for depolymerizing polyesters. More particularly, the invention is directed to a process for depolymerizing polyesters by subjecting the polyesters to catalysts, and organic solvents which are substantially free of oxygen and water.

BACKGROUND OF THE INVENTION

Linear polyesters such as poly(alkylene terephthalates) are well known commercially available polymers. They have many valuable characteristics including strength, toughness, high gloss and solvent resistance. Linear polyesters are conventionally prepared by the reaction of a diol with a functional derivative of a dicarboxylic acid, typically a diacid halide or ester. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. Such desired properties stem from the fact that macrocyclic polyester oligomers exhibit low viscosities, allowing them to impregnate a dense fibrous preform easily. Furthermore, such macrocyclic polyester oligomers melt and polymerize at temperatures well below the melting point of the resulting polymer. Thus, melt flow, polymerization and crystallization can occur isothermally and, therefore, the time and expense required to thermally cycle a tool is favorably reduced.

Previously known methods for producing macrocyclic polyester oligomers typically employ amine catalysts and corrosive acid halides such as terephthaloyl chloride. Such methods are often undesirable since they require environmentally unfriendly halides and expensive recycling steps associated with the formation of byproduct amine salts. Other methods employ cumbersome steps including the distillation of solvents over calcium hydride.

The instant invention, therefore, is directed to a novel process for producing macrocyclic polyester oligomers, wherein the method comprises the step of subjecting polyesters to catalysts, and organic solvents which are substantially free of oxygen and water.

DESCRIPTION OF THE PRIOR ART

Processes for preparing polyesters have been disclosed in the art. In commonly assigned U.S. Pat. No. 5,039,783, macrocyclic polyester oligomers are prepared via the condensation of diols with diacid chlorides in the presence of non-sterically hindered amine catalysts.

Additionally, in commonly assigned U.S. Pat. No. 4,132,707, a method for converting linear polyesters to branched copolyesters is described. In said method, poly(alkylene terephthalate) is combined with a mixture of phenol and tetrachloroethane and a branching component in order to produce a solid particulate blend. The solid particulate blend is subsequently heated in the presence of an inert gas in order to produce the desired branched copolyester.

Still other investigators have focused on the production of polyesters. In commonly assigned U.S. Pat. No. 5,407,984, a method for producing macrocyclic polyester oligomers with tin catalysts is described.

SUMMARY OF THE INVENTION

In a first aspect, the instant invention is directed to a novel process for producing macrocyclic polyester oligomers. The novel process comprises the step of contacting in the presence of heat:

(a) polyester linears;
(b) organic solvents which are substantially free of oxygen and water; and
(c) depolymerization catalysts.

In a second aspect, the instant invention is directed to a continuous process for producing macrocyclic polyester oligomers.

Moreover, the instant invention unexpectedly results in, among other things, the conversion of polyester linears to macrocyclic polyester oligomers wherein equilibrium is reached in about 30 minutes and preferably in about 20 minutes and most preferably in about 10 minutes, and it does not require the use of amines and corrosive acid halides including terephthaloyl chloride.

The instant invention also unexpectedly results in the formation of impurities that are insoluble in organic solvents, and therefore, such impurities do not interfere with the recovery and purity of the desired macrocyclic polyester oligomers. Additionally, reaction rates observed in this invention are at least about 5 times and preferably at least about 10 times greater than reaction rates observed in conventional methods, and titanate catalysts may be employed without the need to employ cumbersome distillation steps.

Depolymerization is defined herein to mean the conversion of a polyester linear to a macrocyclic polyester oligomer having a molecular weight less than said polyester linear.

DETAILED DESCRIPTION OF THE PREFERRED EMBODIMENTS

In the instant invention, polyester linears are defined as oligomers and polymers and they have the formula

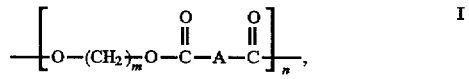

wherein m is 2 to 10 and preferably 2 to 4 and n is 20 to 500 and preferably 50 to 300 and most preferably 100 to 200 and A is a mono- or polycyclic divalent aromatic radical and preferably a 1,3- or 1,4-divalent aromatic radical and most preferably a 1,4-divalent aromatic radical when A is monocyclic. Additionally, when A is a polycyclic divalent aromatic radical, it is preferably a 1,4-, 1,5- or 2,6-naphthylenic radical. Moreover, said polyester linears may have branched side chains.

The polyester linears employed in the instant invention and described above are poly(alkylene dicarboxylates) and typically of the family consisting of polymeric glycol terephthalates or isophthalates and mixtures thereof including copolyesters of terephthalic and isophthalic acids. Especially preferred polyester linears employed in the instant invention are poly(1,2-ethylene terephthalate) (PET) and poly(1,4-butylene terephthalate) (PBT) and copolyesters comprising the same. Said copolyesters typically comprise less than about 25% by weight PET but preferably less than about 15% by weight PET. Other preferred polyester linears include poly(1,2-ethylene 2,6-naphthalenedicarboxylate) (PEN) and the like.

The polyester linears employed in this invention are commercially available and often prepared by the alcoholysis of esters of phthalic acid with a glycol and subsequent polymerization which is achieved by heating the resulting mixture in the presence of an ester interchange catalyst. Other descriptions for the preparation of the above-mentioned polyester linears may be found in commonly assigned U.S. Pat. No. 4,126,592, the disclosure of which is incorporated herein by reference.

The organic solvents that may be employed in the instant invention are well known and commercially available and they include those having a boiling point of at least about 110° C. Illustrative examples of the organic solvents that may be employed in the instant invention include chlorobenzene, naphthalene, toluene, tetramethylbenzene, methylnaphthalene, o-dichlorobenzene and mixtures thereof. The preferred organic solvent, however, is o-xylene.

There is no limitation with respect to the catalysts which may be employed in the instant invention other than that they do not decompose at the temperatures employed and that they are capable of enhancing the depolymerization of the polyester linears.

The above-mentioned catalysts which may be employed in this invention include, for example, tin catalysts and titanate catalysts. The tin catalysts are often commercially available and include organotin compounds such as dialkyltin catalysts like dialkyltin oxides and dialkyltin alkoxides, stannoxanes and spiro tin compounds. Such tin catalysts are described in U.S. Pat. No. 5,407,984, the disclosure of which is incorporated herein by reference.

The titanate compounds which may be employed in this invention are often commercially available and include, for example, alkyl titanates like 2-ethylhexyl titanate, tetrakis-(-2-ethylhexyl) titanate, tetrabutyl titanate and tetraisopropyl titanate, and alkoxy titanates like titanium methoxide, titanium ethoxide and diisopropoxide bis(2,4-pentanedionate). Other titanium catalysts which may be employed include glycol titanates like the butanediol titanates disclosed in U.S. patent application RD-24626, the disclosure of which is incorporated herein by reference.

There are no limitations with respect to the amount of solvent employed other than said amount results in the dissolution and subsequently depolymerization of the polyester linears. Often, however, the concentration of the resulting solution is less than about 0.30M and preferably less than about 0.20M and most preferably less than about 0.10M, based on total moles of monomer unit in the polymer.

The reaction temperatures (presence of heat) that may be chosen in the instant invention are also not limited. Typically, any temperature that results in the depolymerization of polyester linears in the solvent may be employed. Often, however, the temperatures chosen are from about 150° C. to about 280° C. but preferably from about 180° C. to about 260° C. and most preferably greater than about 220° C. to about 250° C.

The amount of catalyst employed in the instant invention is usually from about 1.0 to about 5.0 mole percent tin for every polyester monomer unit and preferably from about 2.0 to about 3.0 mole percent tin or titanate catalyst for every polyester monomer unit.

When conducting the instant invention, the polyester linears may be added to the solvent. Stirring may be employed to induce solution formation and pressure may be varied to optimize reaction conditions. Sparging of the solvent with an inert gas may occur at any time prior to catalyst addition, and preferably while heating. The temperature at which the sparging occurs is only limited to the extent that it is lower than the boiling point of the solvent employed. Often, the temperature of the solvent while sparging is less than about 150° C. and preferably less than about 100° C. Sparging is defined herein to mean bubbling in an inert gas (preferably nitrogen) into the organic solvent to drive out any oxygen and water present in the solvent; therefore, rendering the solvent substantially dry and substantially free of oxygen. Substantially dry is defined herein to mean no more than about 50 and preferably no more than about 25 and most preferably no more than about 15 ppm of water is present in the solvent. Substantially free of oxygen is defined herein to mean less than about 20 ppm and preferably less than about 15 ppm and most preferably less than about 10 ppm of molecular oxygen as determined by gas chromatography analysis. The catalyst can be added as a solid to the mixture although solutions consisting of solvent and catalyst can also be used. Heat may be supplied prior to, during or after the additions. Equilibrium is typically observed in the resulting product solution within 2 hours and often from about 5 minutes to about 2 hours. The desired and resulting macrocyclic polyester oligomers can be separated from the product solution by cooling said product solution to between about 50 to about 120° C. and preferably between about 60 to about 100° C. to induce precipitation of the linear polyester followed by filtering. The macrocyclic polyester oligomers are recovered by evaporation of the resulting filtrate to remove any remaining solvent. The recovered macrocyclic polyester oligomers are substantially pure and often at least about 75% pure and preferably at least about 85% pure and most preferably at least about 95% pure. Moreover, the macrocyclic polyester oligomers produced contain less than about 5.0 percent polyester linears and preferably less than about 2.0 percent polyester linears and most preferably less than about 1.0 percent polyester linears.

Such a reduced level of polyester linears in the macrocyclic polyester oligomers produced is the result, for instance, of the sparging of the organic solvent which allows for the depolymerization to be carried out at higher temperatures. This, in turn, renders it convenient to depolymerize polyester linears while simultaneously decomposing hydroxybutyl terminated oligomers. Such hydroxybutyl terminated oligomers are impurities soluble in organic solvents and typically found when producing macrocyclic polyester oligomers. In the instant invention, the conditions employed unexpectedly lead to the formation of organic solvent insoluble carboxylic acid terminated oligomers and tetrahydrofuran by-products, all of which do not interfere with the production and recovery of substantially pure macrocyclic polyester oligomers.

There is no limitation with respect to the apparatus which may be employed in this invention other than that it is one which allows for the depolymerization of the polyester linears. To this end, any batch reactor may be employed including any glass or stainless steel mixing vessel/reactor.

In a preferred embodiment, however, tubular reactors such as those comprising several tubes in parallel with the capacity for reactants to enter one end and products to leave an opposite end are employed for the continuous production of macrocyclic polyester oligomers. Heat transfer to such a tubular reactor may be accomplished by means of, for instance, a heating jacket and the reactor may be equipped with a pump to force the flow of reactants and product.

Moreover, it is also within the scope of this invention to pack such a reactor with catalyst pellets or inert solids, either of which may enhance the depolymerization, and such an apparatus may comprise a feed tank capable of holding a slurry of reactants and solvent.

In a most preferred embodiment, a continuous stir tank reactor may be employed. Such a reactor often comprises stir tank reactors in series or a single reaction vessel divided into a number of compartments. The continuous stir tank reactors may be equipped with a heating mechanism, and like the tubular reactors, they may also be equipped with a pump to force the flow of reactants and products as well as a feed tank capable of holding a slurry of reactants and solvent.

The tubular reactor and continuous stir tank reactor mentioned above may be employed, among other reasons, to continuously produce the desired macrocyclic polyester oligomers, and both reactors are described in *Chemical Engineers' Handbook*, fifth edition, pages 4–20 to 4–22 (1973), the disclosure of which is incorporated herein by reference.

The following examples are provided to illustrate and facilitate an understanding of the instant invention. The products obtained may be confirmed, for instance, by high performance liquid chromatography (HPLC) or mass spectroscopy and molecular weight may be confirmed via gel permeation chromatography.

EXAMPLE I

A clean stainless steel reactor equipped with a magnetically coupled stirrer and heater with controls was charged with 600 ml (522 grams) of o-xylene, and 7.4 grams (0.036moles) of PBT pellets (Mw=105,000 based on polystyrene standards) to produce a 0.06M polymer/o-xylene solution. The solution was warmed to 100° C. and sparged with dry nitrogen until the moisture content of water was about 5 ppm. Sparging also removed the dissolved oxygen in the solvent and inerted the reactor. The reactor was then sealed and the solvent was heated to about 220° C. After the temperature was stabilized, 3.5 moles of catalyst, titanium butane diol,(based on total moles of polyester monomer units) were added to the system by pressure transferring the catalyst into the system with the aid of dry o-xylene (flushing catalyst into the system to ensure complete transfer) and nitrogen. This marked time zero in the experiment. The resulting reaction mixture was sampled by removing 1–2 ml samples of the mixture periodically from the system using the system's pressure as the driving force and a small sintered filter placed in the system to provide the pressure drop to atmospheric conditions. The collected samples were analyzed by HPLC to determine yields of macrocyclic polyester oligomers. After about 1 hour, the catalyst was quenched by the addition of water (16.5 moles) by adding the water in an o-xylene mixture. The water/o-xylene mixture was pressure transferred into the system, and the system was then allowed to cool to 75° C. with stirring in progress. The resulting reacted mixture was then filtered through a heated filter. Filtration resulted in removal of the precipitated linear impurities (carboxylic acid terminated linears) from the system. The filtrate which contained the desired macrocyclic polyester oligomers (dissolved state at 75° C.) was then rotavaped down to about 5ml and then anti-solvent (pentane) was added to induce precipitation of the oligomers. The precipitated oligomers were filtered off and dried. Equilibrium was reached after about 10 minutes and yield was determined to be about 55%. Purity of the oligomers obtained was greater than 99%, indicated by no observable hydroxybutyl terminated linears in the product.

EXAMPLE 2

Example 2 was conducted in a manner similar to the one described in example 1 except that 3.42 mole % of catalyst was employed and the reaction temperature was about 240° C. The resulting reaction mixture reached equilibrium after about 10 minutes, yield was approximately 60% and the purity of the macrocyclic polyester oligomer was about 99%, indicated by no observable hydroxybutyl terminated linears in the product.

EXAMPLE 3

Example 3 was conducted in a manner similar to the one described in example 1 except that 2 mole % of catalyst was employed, the reaction temperature was 240° C., a PBT/PET 95:5 (mole ratio) linear copolymer was used and a continuous tubular reactor (having a coiled tube of 80 ft in length with an outside diameter of 0.5 inches and an inside diameter of 0.45 inches) was employed in lieu of a stainless steel reactor. The resulting macrocyclic copolyester oligomer yield was approximately 60% and the purity of the macrocyclic polyester oligomer was about 99%, indicated by no observable hydroxybutyl terminated linears in the product.

EXAMPLE 4

Example 4 was conducted in a manner similar to the one described in Example 1 except that no sparging with nitrogen took place. Product yield was less than 20%.

EXAMPLE 5

Example 5 was conducted in a manner similar to the one described in Example 2 except that no sparging with nitrogen took place. Product yield was less than 15%.

What is claimed is:

1. A process for depolymerizing polyester linears comprising the step of contacting in the presence of heat a mixture consisting essentially of:
   (a) polyester linears;
   (b) organic solvents which are substantially free of oxygen and water; and
   (c) depolymerization catalysts selected from the group consisting of tin compounds and titanium compounds.

2. A process for depolymerizing polyester linears in accordance with claim 1 wherein said polyester linears are polymers or oligomers.

3. A process for depolymerizing polyester linears in accordance with claim 2 wherein said polyester linears have structural units of the formula

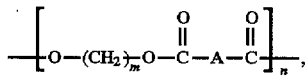

wherein m is 2 to 10, n is 20 to 500 and A is a mono- or polycyclic divalent aromatic radical.

4. A process for depolymerizing polyester linears in accordance with claim 3 wherein m is 2 to 4 and n is 50 to 300.

5. A process for depolymerizing polyester linears in accordance with claim 3 wherein A is a monocyclic divalent aromatic radical.

6. A process for depolymerizing polyester linears in accordance with claim 5 wherein said monocyclic divalent aromatic radical is a 1,3- or 1,4-divalent aromatic radical.

7. A process for depolymerizing polyester linears in accordance with claim 3 wherein A is a polycyclic divalent aromatic radical.

8. A process for depolymerizing polyester linears in accordance with claim 7 wherein said polycyclic divalent aromatic radical is a 1,4-, 1,5- or 2,6-naphthalenic radical.

9. A process for depolymerizing polyester linears in accordance with claim 1 wherein said polyester linears are poly(1,2-ethylene terephthalate), poly(1,4-butylene terephthalate) or copolyesters thereof.

10. A process for depolymerizing polyester linears in accordance with claim 1 wherein said polyester linear is poly(1,2-ethylene 2,6-naphthalenedicarboxylate).

11. A process for depolymerizing polyester linears in accordance with claim 1 wherein said depolymerization catalyst is a titanium compound.

12. A process for depolymerizing polyester linears in accordance with claim 11 wherein said titanium compound is isopropyl titanate, 2-ethylhexyl titanate, tetrakis-(-2-ethylhexyl)titanate, tetrabutyl titanate tetraisopropyl titanate, titanium methoxide, titanium ethoxide, diisopropoxide bis(2,4-pentanedionate) or butanediol titanates.

13. A process for depolymerizing polyester linears in accordance with claim 1 wherein said organic solvents which are substantially free of oxygen and water are organic solvents that were purged with an inert gas.

14. A process for depolymerizing polyester linears in accordance with claim 13 wherein said inert gas is nitrogen.

15. A process for depolymerizing polyester linears in accordance with claim 1 wherein said organic solvents that are substantially free of oxygen and water have no more than about 50 ppm of water and are at least about 90% oxygen free.

16. A process for depolymerizing polyester linears in accordance with claim 15 wherein said organic solvents have a boiling point of at least about 110° C.

17. A process for depolymerizing polyester linears in accordance with claim 16 wherein said solvents are o-xylene, chlorobenzene, naphthalene, toluene, tetramethylbenzene, methylnaphthalene, o-dichlorobenzene or mixtures thereof.

18. A process for depolymerizing polyester linears in accordance with claim 1 wherein said heat is from about 150° C. to about 280° C.

19. A process for depolymerizing polyester linears in accordance with claim 1 wherein said polyester linears and organic solvents that are substantially free of oxygen and water result in a solution having a concentration of less than about 0.30M based on total moles monomer units in the polymer.

20. A process for depolymerizing polyester linears in accordance with claim 1 wherein said depolymerization catalyst is employed in an amount from about 1.0 to about 5.0 mole percent based on total moles of polyester monomer units.

21. A process for depolymerizing polyester linears in accordance with claim 1 wherein said mixture becomes a product solution which is cooled to a temperature between about 50° C. to about 100° C. to precipitate polyester linears and produce a solution having macrocyclic polyester oligomers dissolved therein.

22. A process for depolymerizing polyester linears in accordance with claim 21 wherein said macrocyclic polyester oligomers are recovered from said solution by evaporating the solvents.

23. A process for depolymerizing polyester linears in accordance with claim 1 wherein said process is a batch or continuous process.

24. A process for depolymerizing polyester linears in accordance with claim 1 wherein said process further comprises the step of filtering off insoluble polyester linears.

25. A process for depolymerizing polyester linears in accordance with claim 24 wherein said insoluble polyester linears are carboxylic acid terminated polyester linears.

26. A process for depolymerizing polyester linears in accordance with claim 21 wherein said product solution is substantially free of hydroxybutyl terminated linear oligomers.

27. A process for depolymerizing polyester linears in accordance with claim 1 wherein said organic solvents that are substantially free of oxygen and water have no more than about 15 ppm of water and less than about 20 ppm of molecular oxygen.

* * * * *